S. D. SIMMONS & H. AMLING.
SPRING HUB CONSTRUCTION FOR VEHICLE WHEELS.
APPLICATION FILED MAY 5, 1915.
1,173,048.
Patented Feb. 22, 1916.
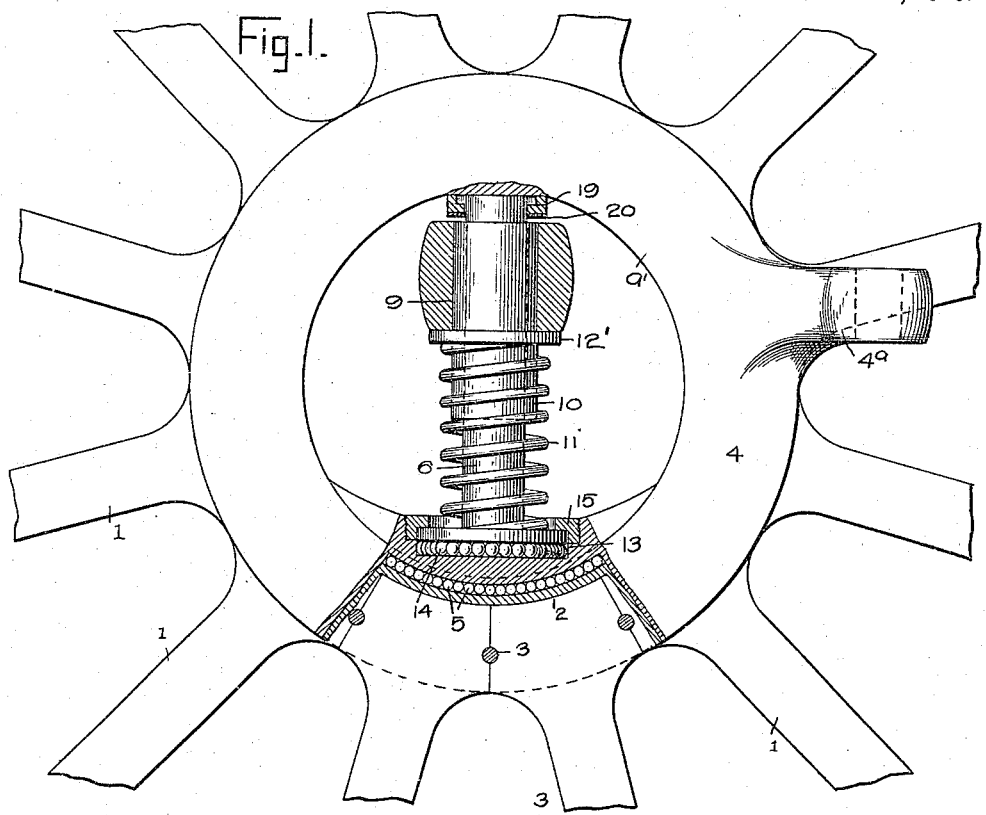
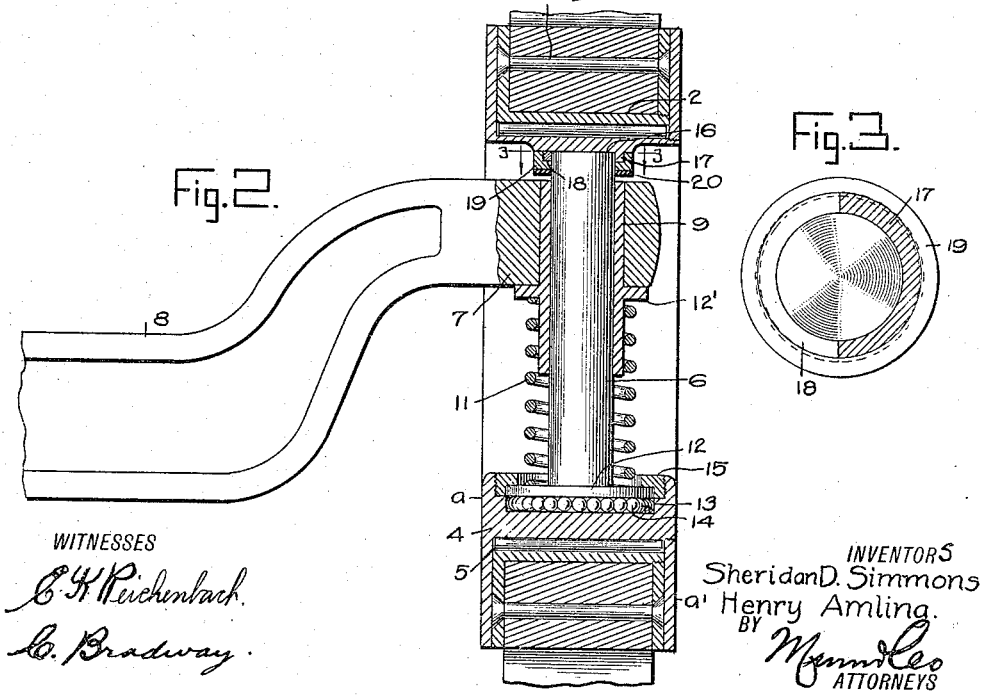

UNITED STATES PATENT OFFICE.

SHERIDAN DANA SIMMONS AND HENRY AMLING, OF NEW YORK, N. Y.; SAID SIMMONS ASSIGNOR TO SAID AMLING.

SPRING-HUB CONSTRUCTION FOR VEHICLE-WHEELS.

1,173,048.

Specification of Letters Patent.

Patented Feb. 22, 1916.

Application filed May 5, 1915. Serial No. 25,923.

*To all whom it may concern:*

Be it known that we, SHERIDAN D. SIMMONS and HENRY AMLING, citizens of the United States, and residents of the city of New York, borough of the Bronx, in the county of Bronx and State of New York, have invented a new and Improved Spring-Hub Construction for Vehicle-Wheels, of which the following is a full, clear, and exact description.

This invention relates to vehicle wheels and has to deal more particularly with a resilient hub construction whereby pneumatic or other resilient tires and their attendant disadvantages are dispensed with.

The general objects of the present invention are to improve and simplify the construction of vehicle wheels so as to be reliable and efficient in use, comparatively inexpensive to manufacture, and so designed as to provide the desired resiliency to insure easy running of the vehicle equipped with the wheels.

A more specific object of the invention is the provision of a wheel having spring means embodied in the hub and acting between the wheel and the axle to provide a cushioning action between the wheel and vehicle body.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view, partly in section, of the wheel hub construction; Fig. 2 is a vertical sectional view thereof; and Fig. 3 is a horizontal section on the line 3—3, Fig. 2.

Referring to the drawing, 1 designates the spokes of a wheel, which are set into a channeled spoke ring 2 and fastened in place by rivets or equivalent means 3. This spoke ring 2 is rotatably mounted in a hub ring 4 which is also channel shaped to form a guideway in which the spoke ring is free to rotate, and interposed between the two rings may be bearing rollers or equivalent anti-friction devices 5. The hub ring is made in two sections $a$ and $a'$ detachably connected in any suitable manner.

The wheel herewith shown is a steering wheel of an automobile, and therefore a vertical pivot 6 extends diametrically of the hub ring, and to this pivot the end 7 of the axle 8 is connected. The axle has an opening 9 in which is a sleeve 10 that slides longitudinally of the pivot 6, and surrounding the pivot and disposed under the axle is a cushioning spring 11. The upper end of the spring bears under an annular flange 12' on the sleeve 10, and on the upper side of the flange rests the end 7 of the axle. The lower end of the pivot is provided with a base plate 12 which sets into a chamber 13 in the bottom portion of the hub ring, and interposed between the bottom of this chamber and the bottom of the plate 12 is a layer of anti-friction balls 14 for insuring easy turning of the steering wheel on the pivot. The base plate of the pivot is held in place by a ring 15 that is threaded in the ball-holding chamber 13. The upper end of the pivot is engaged in a socket 16 formed by a semi-circular flange 17 at the top of the hub ring, and by a semi-circular piece 18 which coöperates with the flange 17 to form a complete circular socket that receives the upper end of the pivot 6. A retaining ring 19 is threaded around the flange 17 and semi-circular part 18, so that the upper end of the pivot is held effectively in place. Interposed between the clamping ring 19 and the top of the axle is a cushioning washer or equivalent means 20.

Any suitable means may be employed for moving the wheel for steering purposes, and, as shown in Fig. 1, the hub ring 4 has an arm 4ª extending therefrom to which a steering device is connected.

From the foregoing description taken in connection with the accompanying drawing, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. A wheel construction comprising an annular spoke section, an annular hub section in which the spoke section rotates, the bottom portion of the hub section having a socket open at its top, a vertically disposed pivot having its lower end disposed in the socket, an axle having an opening through which the pivot extends, a spring surrounding the pivot and forming a cushion for the axle, and a socket at the top portion of the hub section for receiving the upper end of the pivot, said last-mentioned socket being made in detachable parts for permitting the detachment of the wheel from the axle while the hub and spoke sections remain assembled.

2. In a wheel construction, the combination of an axle having a vertical opening in its end, a vertical pivot disposed in the opening, a wheel hub section in the form of a ring, a socket in the bottom portion of the ring and open upwardly to receive the lower end of the pivot, a socket on the upper part of the ring for receiving the upper portion of the pivot, said last mentioned socket having a half section assembled to permit the pivot to be disengaged laterally, a wheel spoke section of annular form rotatably mounted on the hub section, and a spring surrounding the pivot and disposed under the axle to cushion the same.

3. A vehicle wheel comprising a channeled hub ring, a spoke-carrying ring rotatably mounted therein, the lower portion of the hub ring having a chamber, a vertical pivot extending diametrically of the hub ring and having a base plate disposed in the chamber, a layer of anti-friction devices interposed between the bottom of the chamber and the said base plate of the pivot, an axle extending into the hub ring and having an opening through which the pivot extends, and a helical compression spring interposed between the base plate and the axle, said pivot being removable laterally from the hub ring while the spoke-carrying ring remains in position on the latter.

4. A vehicle wheel comprising a channeled hub ring, a spoke-carrying ring rotatably mounted therein, the bottom of the ring having a chamber, a vertical pivot extending diametically of the hub ring and having a base plate disposed in the chamber, a layer of anti-friction devices interposed between the bottom of the chamber and the said base plate of the pivot, an axle extending into the hub ring and having an opening through which the pivot extends, a helical compression spring interposed between the base plate and the axle, and means for detachably connecting the upper end of the pivot with the top portion of the hub ring, said pivot being removable laterally from the hub ring while the spoke-carrying ring remains in position on the latter.

In testimony whereof we have signed our names to this specification in the presence of two subscribing witnesses.

SHERIDAN DANA SIMMONS.
HENRY AMLING.

Witnesses:
DAVID SAUCKY,
SHERWOOD GEER.

Copies of this patent may be obtained for five cents each, by addressing the "Commissioner of Patents, Washington, D. C."